United States Patent Office 3,083,183
Patented Mar. 26, 1963

3,083,183
PROCESS FOR PRODUCING PHENOLIC RESINS USING ZINC BORATES AS CONDENSING AGENTS
Ulrich Boschert, Afton, and Robert B. Dean, Bainbridge, N.Y., assignors to The Borden Company, New York, N.Y., a corporation of New Jersey
No Drawing. Filed Mar. 3, 1960, Ser. No. 12,508
6 Claims. (Cl. 260—57)

This invention relates to fast curing phenolic resins and particularly to the resinous product of condensation of a phenol with formaldehyde in contact with a bivalent metal borate as the catalyst.

Zinc salts of organic acids such as zinc acetate have been used heretofore in making fast curing and long flow novolak resins. When the phenol used contains a substantial proportion of cresol, alkyl phenols, or polyhydric phenols, the flow of the product has been longer than advantageous for many uses.

We have now discovered that soluble borates of bivalent metals make satisfactory the use of these other phenols, as the starting material, without objectionable lengthening of the flow.

Briefly stated, the invention comprises the herein described process and the product of condensing a phenol with a source of formaldehyde in contact with a borate of zinc or like bivalent metal.

In the preferred embodiment, the invention comprises condensing the selected phenol with the aldehyde to a thermosetting intermediate and then continuing the reaction to a product that loses the thermosetting characteristic and becomes thermoplastic, that is, softenable, on heating.

The phenol used may be the monohydroxy benzene although this phenol does not show the full advantage from the use of our catalyst, since the problem of too long flow is not as great here as with other phenols. We use to advantage natural phenol (about 90% phenol and 10% cresol); polyhydroxy phenols such as resorcinol, bisphenol $CH_2(C_6H_4OH)_2$, bisphenol-A $$(CH_3)_2C(C_6H_4OH)_2$$

and phloroglucinol; alkyl phenols including o-, m-, and p-cresols and the corresponding xylenols, and mixtures of any of these phenols with isomeric or other phenol.

The source of formaldehyde is ordinarily the commercial aqueous formalin solution, examples of which are the solutions of 37% and 44% concentrations. There may be used for some purposes paraformaldehyde or a polyoxymethylene.

The bivalent metal borate is one that is soluble in the aqueous phenol and formaldehyde mix in which the condensation is effected and soluble, i.e., as such or as a reaction product, in the condensate, even when the latter is substantially anhydrous. The salt must be practically colorless or of color not interfering with the appearance of the finished resin in the use for which intended. The salt ordinarily used is zinc borate. Manganese or nickel borates also may be used but they have disadvantages, economic or other, and no known offsetting advantage over the zinc salts. Borates of other bivalent metals are not commercially available.

Various ratios of the bivalent metal to the boron component of the borate may be used as, for instance, 0.5–1.25 atomic proportions of the metal for 1 atomic proportion of boron. Thus we may use zinc borates represented by the following formulas: $ZnO \cdot B_2O_3$, $3ZnO \cdot 2B_2O_3$ and $5ZnO \cdot 2B_2O_3$, any one of their hydrates, or a mixture of the said borates. For reasons of commercial availability, economy and effectiveness, the compound $3ZnO \cdot 2B_2O_3$ is recommended particularly as the catalyst.

The ratio of the formaldehyde to the phenol being condensed therewith should be about 0.4–1 mole and for best results 0.5–0.88 mole for 1 of the phenol. Amounts larger than the maximum shown will cause premature gelation of the resin. Proportions below 0.4 mole of formaldehyde are uneconomical and unnecessary.

When phenol is used in admixture with another phenol, such as cresol, resorcinol, or any other formaldehyde-reactive alkyl or polyhydric phenol, the proportion of the other phenol should be at least 10% of the total phenols used, in order to show substantial effect.

The proportion of the salt of the bivalent metal to be used is 0.1 to 5, usually, 0.4 to 1.2, parts for 100 by weight of the selected phenol on the anhydrous basis.

When the thermoplastic resin of our invention is to be cured, it is compounded with a usual formaldehyde donor curing agent such as hexamethylene tetramine, as in the proportion of 5 to 20 parts for 100 parts of the resin, 10–15 in most cases.

As to conditions of operation, the selected phenol, formaldehyde, and borate as catalyst are reacted, as at reflux temperature, until the content of unreacted formaldehyde ceases to fall rapidly. Ordinarily the reaction is carried to the point at which no free formaldehyde can be detected by odor as below 1% of the mixture. Then water and any free phenol present are distilled away and the remaining material warmed to a temperature above the boiling point of water, as to about 110°–140° C., but preferably 115–130° C. The warming is discontinued when the reaction mass still retains the characteristic of a single stage resin, that is, will advance to a cross-linked gel state without the addition of extra formaldehyde, as by hexamethylene tetramine, when put on a hot plate at 150° C. The intermediate thermosetting resinous condensation product so formed is then converted from the single stage to permanently fusible condition by continuing the reaction at a temperature of about 115°–130° C., suitably under a reflux condenser, until a specimen of the resin when removed from the mass and subjected to the hot plate test above will neither gel nor increase substantially in viscosity in the 150° C. test. This condition indicates the end of the reaction. Any water remaining from the original formaldehyde solution, liberated water of condensation and any substantial amount of the selected phenol that may remain unreacted are distilled off, either at atmospheric pressure or under vacuum, to give a thermoplastic product which, when cold, is readily grindable.

The condensate so made, when mixed with 10% or so of hexamethylene tetramine, is useful as a fast curing molding powder or as a phenolic varnish after being dissolved in alcohol. The condensate shows no substantial separation of zinc, borate or other material on standing. In the quantities employed the presence of borates has a negligible influence on the flammability.

The invention will be further illustrated by description in connection with the following specific examples. In these examples and elsewhere herein proportions are expressed as parts by weight except where specifically stated to the contrary.

Example 1

940 parts of phenol (U.S.P. grade, 10 moles), 477 parts of aqueous formaldehyde (44% concentration, 7 moles) and 6.55 parts of zinc borate ($3ZnO \cdot 2B_2O_3$) were charged to a reaction vessel, stirred, and heated therein to refluxing. After solution was first completed, the pH was 4.4. The mixture was condensed at 100°–103° C. under refluxing for 120 minutes.

At the end of this period, the refluxing was discontinued and the water and a small part of the unreacted phenol were slowly distilled off at atmospheric pressure until the temperature of the remaining resin reached 125° C. The material at this stage was thermosetting when tested at 150° C. The temperature was held at 125° C. for 1 hour, to complete the reaction, i.e., this causing conversion of the thermosetting intermediate to the final, thermoplastic end product. Additional volatiles were distilled off until a sample became hard and grindable when cooled to room temperature.

*Example 2*

The equipment and technique described in Example 1 were used except as noted.

940 parts of natural phenol (90%, containing about 10% of cresols), 545 parts formaldehyde (44% concentration, 8 moles) and 6.55 parts of zinc borate were charged to the reaction vessel. Immediately after solution, the pH was 5.38. The mixture was condensed at reflux (100°–103° C.) for 160 minutes. At the end of this period, the water and a small part of the unreacted phenol were slowly distilled at atmospheric pressure until the temperature of the resin reached 125° C. The temperature was then held at 125° C. for 1 hour to complete the reaction. Then the remaining volatiles were distilled off under vacuum. This converted the reaction product to a hard thermoplastic material that, after cooling, was hard and grindable.

The products made as described in Examples 1 and 2 have been compared with products made in comparable manner but with the substitution of the zinc borate by an equal weight of zinc acetate.

The rate of cure of the resin, after being mixed with 10% of its weight of hexamethylene tetramine, is reported as seconds required at 155° C. on a hot plate to convert the resin to its cured, infusible form. The flow length is determined by placing a 0.5 g. pellet of the thermoplastic resin with 10% of its weight of hexamethylene tetramine on a glass plate heated in an oven to 125° C., the plate being inclined at an angle of 63° from the horizontal, and noting the distance of flow of the resin on the plate.

| Phenol Used | Zinc Salt Used As Catalyst | Time for Cure, Seconds | Flow mm. |
|---|---|---|---|
| U.S.P. (100%) | Acetate | 18 | 70 |
| U.S.P. (100%) | Borate | 20 | 40 |
| Natural (90%) | Acetate | 19 | 122 |
| Natural (90%) | Borate | 16 | 76 |

*Example 3*

The procedure of Example 1 is followed except that the phenol there used is replaced in turn, by an amount equivalent in the formaldehyde reaction, of ortho, meta and para cresol and mixtures thereof or of any of the other phenols shown herein.

*Example 4*

The procedure of Example 2 is followed except that the zinc borate is replaced by an equal weight of manganese borate in one preparation and by an equal weight of nickel borate in another.

Infrared spectra of the resins made as described show that the cross linking in the resins is between ortho-ortho positions in the aromatic ring, these tests being on products made by the use of pure phenol as the phenolic starting material.

It will be understood that it is intended to cover all changes and modifications of the examples of the invention herein chosen for the purpose of illustration which do not constitute departures from the spirit and scope of the invention.

We claim:

1. In making a resinous condensation product, the process which comprises forming an aqueous mixture of a phenol, formaldehyde and a condensation catalyst consisting essentially of the borate of a metal selected from the group consisting of zinc, manganese and nickel in the proportion of about 0.1–5 parts by weight of the borate for 100 parts of the phenol, heating the said mixture until condensation occurs to an intermediate that is thermosetting under test at a temperature of 150° C., and then continuing the heating of the intermediate and distilling water therefrom at a temperature below that of thermosetting until the said intermediate is converted to a thermoplastic product.

2. The process of claim 1, the said phenol being phenol $C_6H_5OH$.

3. The process of claim 1, the said phenol containing at least 10% of cresol.

4. The process of claim 1, the said phenol containing at least 10% of a phenol selected from the group consisting of formaldehyde-reactive the cresols and xylenols and polyhydric phenols.

5. The process of claim 1, the said phenol being cresol.

6. In making a resin, the process which comprises forming an aqueous mixture of 1 mole of a phenol with about 0.4–1 mole of formaldehyde and a condensation catalyst consisting essentially of borate selected from the group consisting of zinc, manganese and nickel borates, in the proportion of about 0.1–5 parts by weight for 100 parts of the phenol, heating the said mixture at a temperature not above refluxing under the prevailing pressure until a thermosetting intermediate forms, and then heating the intermediate under distillation conditions, to remove therefrom remaining distillable materials, at a temperature below thermosetting of the intermediate until the intermediate is converted to a thermoplastic product that when cooled is hard and grindable.

References Cited in the file of this patent

UNITED STATES PATENTS

| | | |
|---|---|---|
| 2,385,370 | Norton | Sept. 25, 1945 |
| 2,437,710 | Rhodes | Mar. 16, 1948 |
| 2,606,889 | Ward et al. | Aug. 12, 1952 |
| 2,855,382 | Mitchell | Oct. 7, 1958 |
| 2,979,484 | Redfarn | Apr. 11, 1961 |